(12) United States Patent
Amir et al.

(10) Patent No.: US 9,939,512 B1
(45) Date of Patent: Apr. 10, 2018

(54) SYSTEM AND METHOD OF FAST TRANSITION DETECTION IN ASYNCHRONOUS RTLS

(71) Applicant: CenTrak Inc., Newtown, PA (US)

(72) Inventors: Israel Amir, Newtown, PA (US); Robert Musliner, Newtown, PA (US)

(73) Assignee: CENTRAK, INC., Newtown, PA (US)

( * ) Notice: Subject to any disclaimer, the term of this patent is extended or adjusted under 35 U.S.C. 154(b) by 668 days.

(21) Appl. No.: 14/301,359

(22) Filed: Jun. 11, 2014

(51) Int. Cl.
  *G01S 1/00* (2006.01)
  *G01S 1/72* (2006.01)

(52) U.S. Cl.
  CPC . *G01S 1/00* (2013.01); *G01S 1/72* (2013.01)

(58) Field of Classification Search
  CPC ... G01S 1/00; G01S 1/72; G01S 1/725; G01S 1/74; G01S 5/183
  See application file for complete search history.

(56) References Cited

U.S. PATENT DOCUMENTS

| | | | | |
|---|---|---|---|---|
| 2008/0061943 A1* | 3/2008 | Wu | ...................... | G06K 7/0008 340/10.33 |
| 2014/0148196 A1* | 5/2014 | Bassan-Eskenazi | .... | G01S 11/02 455/456.1 |

* cited by examiner

*Primary Examiner* — Cassi J Galt
(74) *Attorney, Agent, or Firm* — Maldjian Law Group LLC (57) ABSTRACT

System and method for real-time location, the system including: a base-station comprising: an interface to a secondary technology communication channel, wherein the base-station configured to emit: a first periodic signal on the secondary technology communication channel and having a first repetition rate, to communicate an identification of the base-station; and a second periodic signal on the secondary technology communication channel and having a second repetition rate, to provide a wake-up signal, wherein transmitted energy of the second periodic signal in one period of the second periodic signal is less than transmitted energy of the first periodic signal in one period of the first periodic signal; and a portable tag configured to receive the first and second periodic signals and control its receiver timing based upon the first and second periodic signals.

21 Claims, 5 Drawing Sheets

SYSTEM AND METHOD OF FAST TRANSITION DETECTION IN ASYNCHRONOUS RTLS

BACKGROUND

Field of the Invention

Embodiments in accordance with the present invention relate to methods and systems for fast detection by a sensor to changes of communication network coverage in an RTL System.

Description of Related Art

Real Time Location Systems (RTLS) have gained in popularity in the last few years. They found their way into many applications ranging from healthcare to schools, fleet location management and many other more specialized applications. RTLS offers enhanced resolution performance by use of secondary technologies such as infrared (IR), Ultrasound (US) and Low Frequency (LF). A spatial area within which secondary technologies is available may be referred to as a zone of influence. Secondary technologies add substantial burden on battery life of RTLS components.

Conventional RTL systems typically use radio frequency (RF) transmission to determine location. The RF-based methods may be augmented with infrared (IR) transmission as a localization method in order to improve accuracy to support room and sub-room level accuracies. An IR receiver typically is incorporated into a portable device (i.e., a tag) and IR transmitters are incorporated into base stations that are scattered in rooms and corridors within the enclosure. Typically, each the IR base stations transmits an identification (ID) to the portable devices, and the location of the portable devices is determined by their vicinity to a base station.

The basic advantages of synchronization of IR-based systems are described in U.S. Pat. No. 8,139,945 ("the '945 Patent") and U.S. Pat. No. 8,604,909 ("the '909 Patent"), which are hereby incorporated by reference in their entirety. Timing synchronization information is transmitted using a plurality of stationary IR base stations and a plurality of portable devices (e.g., portable tags). Each IR base station is configured to receive the timing synchronization information and to transmit a corresponding IR location code in a time period, based on the received timing synchronization information.

In the '945 Patent, each portable device is configured: 1) to receive the timing synchronization information; 2) to detect the IR location codes from the IR base stations; and 3) to transmit an output signal including a portable device ID representative of the portable device and the detected IR location code. Each portable device is synchronized to detect the IR location code in the time period based on the received timing synchronization information. The '945 Patent enables coexistence of multiple IR transmitters at the same physical space, the construction of virtual walls, as well as facilitating high tag update rate with extremely low power consumption for portable tags.

However, some systems are unable to synchronize portable tags. For example, some RTLS utilizing Wi-Fi networks do not have a mechanism to synchronize the portable tags because such tags use specially designed one-directional transmission protocols from the portable tag to the system in order to reduce power consumption. Consequently, the portable tags are unable to receive Wi-Fi signals. In such systems, the portable tags do not know when an infrastructure component is expected to transmit.

As such portable tags are moved, they may move from one zone of influence to a new zone of influence. A zone of influence is a physical region in which transmissions from a system emitter may be received by a portable tag above a predetermined signal level or quality level (e.g., signal-to-noise ratio). Examples of a system emitter include a Wi-Fi base station or a base station using a different wireless transmission medium (e.g., ultrasound, infrared, etc.). A system emitter may also be referred to as an infrastructure emitter. Emissions from a system emitter typically are bursts of communication energy of short durations relative to the periodicity of the transmissions. To be able to receive the signals from the emitters as soon as possible upon arrival of the portable tag into the new zone of the IR or Ultrasound (US) emitters, the portable tags would have to energize (i.e., to enable) their IR (or US) receivers continuously. If the portable tags continuously energized their receivers, the maximum delay between entering a new zone of influence and the detection of a signal transmitted by an emitter would be at most the time between emitters' transmissions.

However, a problem with continually energizing a tag receiver is that it greatly affects battery life of the portable tag, thus making this approach impractical in most cases. Some power savings can be obtained if a portable tag remains within the zone of influence of the same emitter for a long time. In this case, the portable tag can anticipate the next time at which a transmission from the emitter should be received, and can switch off the receiver until that time. Such an anticipation technique can work quite well, with a loss of only about one cycle when the portable tag moves from a first zone of influence for one type of technology (e.g., IR) to a second zone of influence for the same type of technology. However, the anticipation technique will not work when the portable tag moves from an area not within a zone of influence (e.g., an area without an IR transmitter) to an area within a zone of influence. The anticipation technique also may not work if the emitters are not synchronized, in which case a portable tag moving from one IR/Ultrasound zone to another will again require enabling the secondary technology receivers for relatively long periods of times.

To resolve the power consumption problem, manufacturers of RTLS system resort to periodically energizing the IR receiver for a period of time that is longer than the period of time between consecutive transmissions from the emitters. So, for example, a portable tag may energize its IR receiver for slightly more than 3 seconds every 30 seconds. This approach reduces the power consumption of the receivers by 10 times and makes many applications viable. Increasing the transmission rate of emitters would further reduce power consumption of the portable tags, but at the cost of increased power consumption by emitters, many of which are also battery operated. Thus, increasing the emission rate of emitters much above once per second is not practical because of excessive power consumption by the emitters.

Therefore, a need exists to provide a more effective balance between on the one hand conserving battery life of system emitters and portable tags, and on the other hand providing a scheme to quickly detect when a portable tag has moved to a different Wi-Fi zone of influence.

SUMMARY

Embodiments in accordance with the present disclosure include a system for real-time location, the system including: an infrared (IR) base-station, the base-station configured to emit: a first periodic signal having a first repetition rate, to communicate an identification of the IR base-station; and a second periodic signal having a second repetition rate, to provide a wake-up signal, wherein transmitted energy of the second periodic signal in one period of the second periodic signal is less than transmitted energy of the first periodic signal in one period of the first periodic signal; and a portable tag configured to receive the first and second periodic signals and control its receiver timing based upon the first and second periodic signals.

Some embodiments may use ultrasound signals rather than IR signals as a secondary technology communication technology, but otherwise will have substantially the same operation and timing as embodiments that use IR signals. Usage of ultrasound signals may help reduce interference with other devices that may be controlled by IR signals, e.g., a TV in a patient room with an IR remote control.

Embodiments in accordance with the present disclosure may include a system for real-time location, the system including: a base-station comprising: an interfaces to a technology communication channel; wherein the base-station configured to emit on the secondary technology communication channel: a first periodic signal having a first repetition rate, to communicate an identification of the base-station; and a second periodic signal on the secondary technology communication channel and having a second repetition rate, to provide a wake-up signal, wherein transmitted energy of the second periodic signal in one period of the second periodic signal is less than transmitted energy of the first periodic signal in one period of the first periodic signal; and a portable tag configured to receive the first and second periodic signals and control its receiver timing based upon the first and second periodic signals.

Embodiments in accordance with the present disclosure may include a method for real-time location, the method including: emitting a periodic signal burst having a first repetition rate to communicate an identification of the base-station; and also emitting a periodic signal burst having a second repetition rate, to provide a wake-up signal, wherein transmitted energy of the second periodic signal in one period of the second periodic signal is less than transmitted energy of the first periodic signal in one period of the first periodic signal; and receiving the first and second periodic signals by a portable tag; and controlling receiver timing of the portable tag based upon the first and second periodic signals.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize location sensors and other sensors (e.g., temperature and humidity) that communicate with a central monitor.

The exemplary systems and methods of this disclosure may also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein, the term "Wi-Fi" or "conventional Wi-Fi" refers generally to a bi-directional radio communication technology that operates based on one or more of the Institute of Electrical and Electronics Engineers (IEEE) 802.11 family of standards, which are incorporated herein by reference. The IEEE 802.11 standards specify the RF and protocol characteristics of a bi-directional radio communication system.

As used herein, the term "asynchronous RTLS" refers generally to a system in which the infrastructure components (such as IR or Ultrasound emitters) are not synchronized to a central clock.

As used herein, the term "module" refers generally to a logical sequence or association of steps, processes or components. For example, a software module may comprise a set of associated routines or subroutines within a computer program. Alternatively, a module may comprise a substantially self-contained hardware device or circuit device. A module may also comprise a logical set of processes irrespective of any software or hardware implementation.

As used herein, the term "transmitter" may generally comprise any device, circuit, or apparatus capable of transmitting an electrical, electromagnetic, infrared, ultrasonic, or optical signal. As used herein, the term "receiver" may generally comprise any device, circuit, or apparatus capable of receiving an electrical, electromagnetic, infrared, ultrasonic, or optical signal. As used herein, the term "transceiver" may generally comprise any device, circuit, or apparatus capable of transmitting and receiving an electrical, electromagnetic, infrared, ultrasonic, or optical signal.

The term "computer-readable medium" as used herein refers to any tangible storage and/or transmission medium that participates in storing and/or providing instructions to a processor for execution. Such a medium may take many forms, including but not limited to, non-volatile media and volatile media. Non-volatile media includes, for example, NVRAM, flash media, or magnetic or optical disks. Volatile media includes dynamic memory, such as main memory. When the computer-readable media is configured as a database, it is to be understood that the database may be any type of database, such as relational, hierarchical, object-oriented, and/or the like.

In embodiments in accordance with the present invention, a portable tag is customarily an active RFID tag. An active RFID tag uses an internal power source (e.g., a battery) within the portable tag to continuously power the tag and its RF communication circuitry. In contrast, passive RFID relies on RF energy transferred from a reader to the tag to power the tag. Active RFID allows relatively low-level signals to be received by the portable tag, and the tag can generate relatively high-level signals back to the access point. Active tags may also initiate communication with an access point or other tags.

RTL systems are known that include base stations that transmit IR signals (i.e., IR base stations) with their respective base station ID (BS-ID) to portable devices that are equipped with IR receivers. Upon reception of a BS-ID, the portable device transmits both the device ID and the received BS-ID to a reception device, for example, by radio frequency (RF) or IR transmission. The RTL system may include a server that associates the BS-ID with the device ID (received from the portable device by the reception device). In this manner, the position of the portable device may be displayed as the position of the IR base station. In exemplary implementations, both base stations and portable tags are battery operated.

Figure 1:
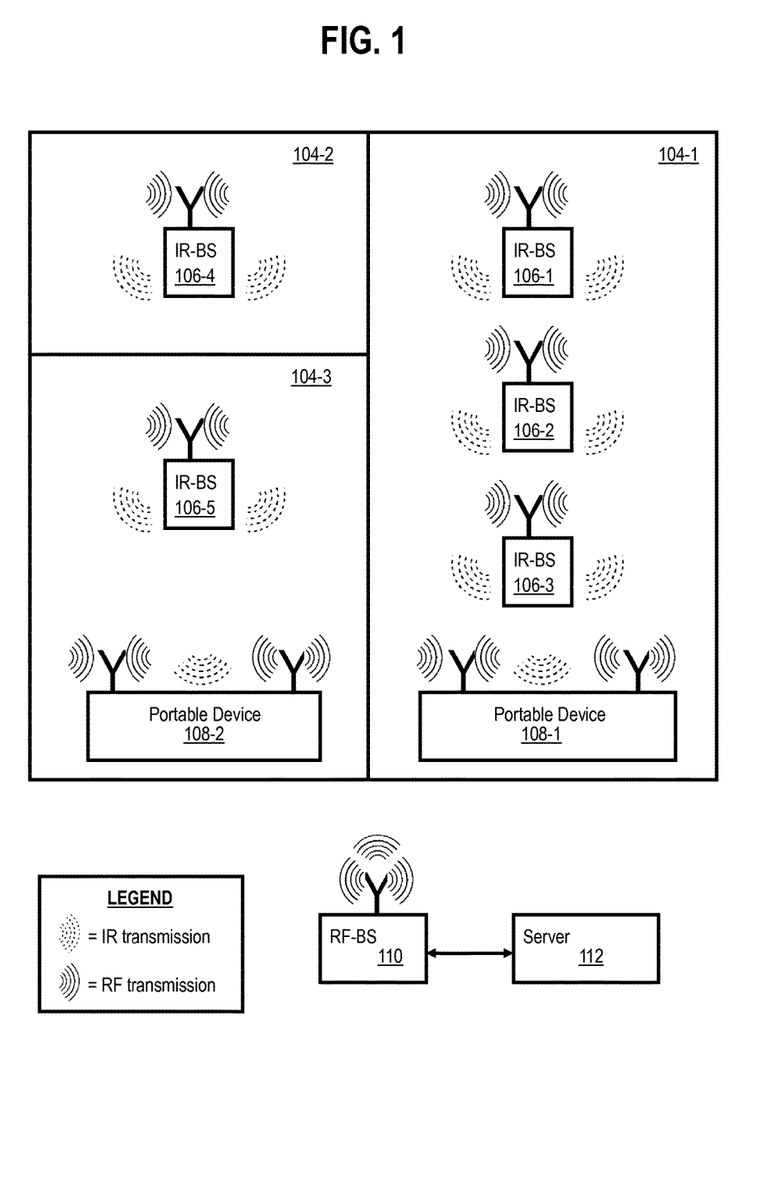
FIG. 1 is a block diagram of a system for locating and identifying portable devices in an enclosure, according to an embodiment of the present invention.

Referring now to FIG. 1, a block diagram is shown of a system 100 for determining a location and an identity of portable devices 108 in an enclosure 102. System 100 may include a plurality of IR base stations (IR-BS) 106, one or more portable devices 108 and at least one RF base station (RF-BS) 110. In some embodiments, RF base station 110 may be a Wi-Fi access point (i.e., an RF access point).

Optionally, RF base station 110 may transmit timing synchronization information (TSI) signal, for example, in a beacon, to IR base stations 106 and portable devices 108 that are each equipped with RF transceivers, by RF transmission. The TSI may be used by IR base stations 106 to transmit a corresponding BS-ID, i.e. an IR location code, in a period of time after receiving the TSI. The period of time for IR base stations 106 to transmit the respective BS-ID signals may be fixed or transmitted as a part of the information carried by the beacon, or obtained through a separate communication channel. Other embodiments in accordance with the present disclosure are usable without usage of a TSI signal.

Enclosure 102 may include a plurality of separate zones 104, which typically coincide with individual rooms or zones within enclosure 102. For example, zone 104-1 represents a corridor. Each room or zone may be provided with at least one IR base station 106. For example, corridor 104-1 includes IR base stations 106-1, 106-2, 106-3.

IR base station 106 typically transmits very short bursts of IR location signals from an IR transmitter (i.e. corresponding BS-IDs) at periodic intervals based on the TSI received from RF-BS 110. Each IR base station 106 may transmit a BS-ID signal that may be identified at a central control (e.g., a server) as originating from a particular zone or room 104. The BS-ID may, for example, be transmitted with an IR modulating frequency that is typically around 40 kHz that may be in the form of bursts of the order of about 0.5 milliseconds long. It is understood that any suitable frequency and duration of the IR burst may be used.

Portable devices 108 may be provided for persons or apparatuses. The portable devices 108 may include an IR receiver and an RF transmitter or transceiver which are coupled to each other. In this manner, the RF transceiver may receive the TSI and may transmit received BS-ID and its device ID at an RF carrier frequency to RF base station 110.

The modulated carrier signal received by RF base station 110 may be decoded to reproduce the BS-ID and the device ID.

Although IR base stations 106 are described, it is contemplated that the base stations 106 may also be configured to transmit a corresponding BS-ID by an ultrasonic signal, such that base stations 106 may represent ultrasonic base stations. Accordingly, portable devices 108 may be configured to include an ultrasonic receiver to receive the BS-ID from an ultrasonic base station. If an ultrasonic interface is used, then a differential time of arrival method may be used for location detection by the portable tag.

Figure 2:
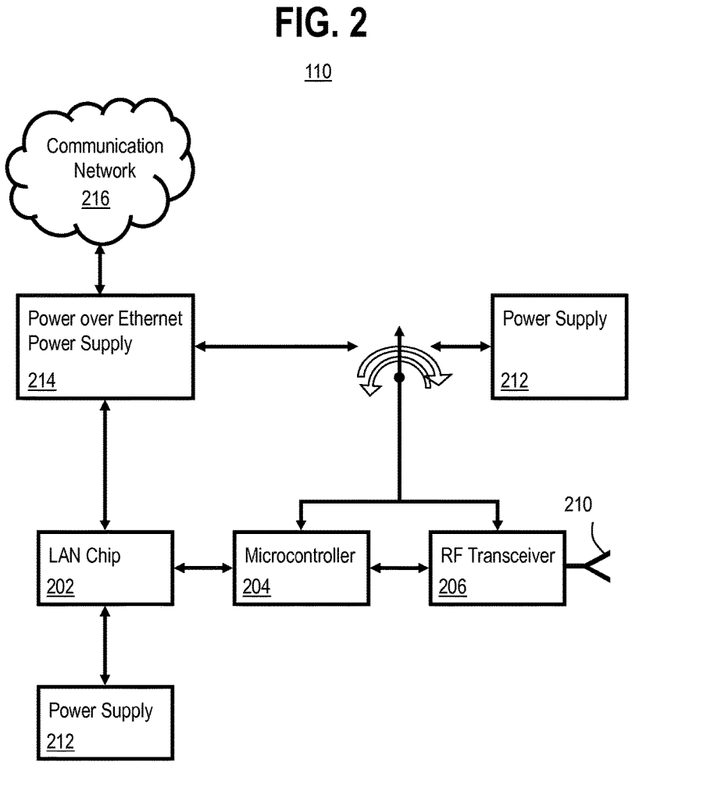
FIG. 2 is a block diagram of a radio frequency (RF) base station, according to an embodiment of the present invention.

FIG. 2 illustrates a block diagram of RF base station 110. RF base station 110 may include local area network (LAN) chip 202, microcontroller 204, RF transceiver 206, and antenna 210 Optionally, in some embodiments, the RF base-stations 110 may have their timing synchronized with each other. In one embodiment of the current invention, if the RF base-stations 110 are synchronized then the RF base-stations 110 may receive their timing synchronization via Ethernet. In another embodiment, the optional timing synchronization may be transferred from one RF base-station 110 to another.

RF transceiver 206 may be configured to receive RF transmissions, for example, from portable device 108 (FIG. 1A) or from another RF base station 110, from antenna 210. RF transceiver 206 may also be configured to transmit the TSI, such as by transmitting an RF beacon that includes the TSI, via antenna 210.

Microcontroller 204 may be configured to control LAN chip 202, and RF transceiver 206, for example, to transmit the TSI, communicate with other RF base stations and receive RF transmissions from portable devices 108 (FIG. 1).

Figure 3:
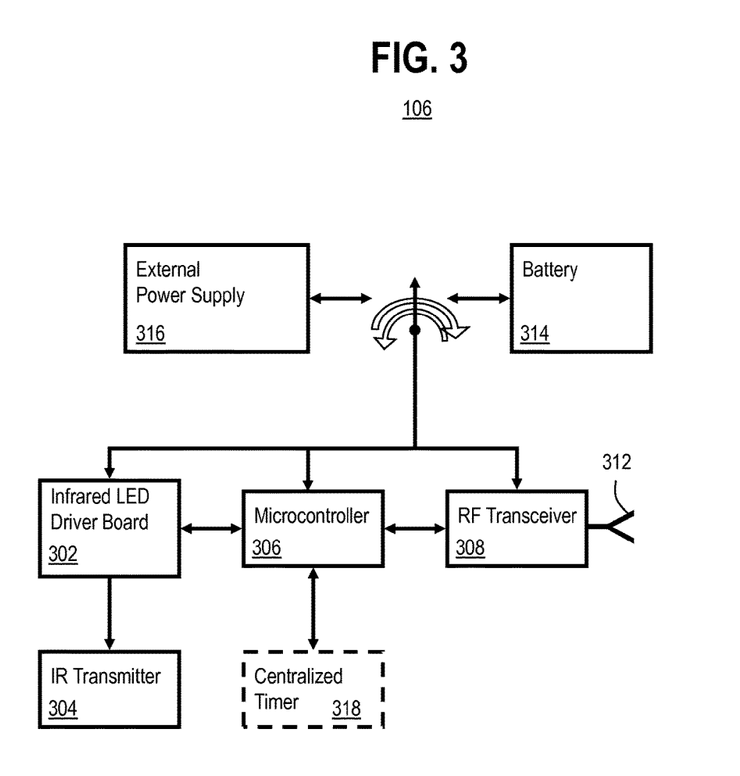
FIG. 3 is a block diagram of an infrared (IR) base station, according to an embodiment of the present invention.

FIG. 3 illustrates a block diagram of IR base station 106. IR base station includes RF receiver or transceiver 308 (henceforth collectively referred to as RF transceiver 308), antenna 312, microcontroller 306, IR LED driver board 302 and IR transmitter 304. IR base station 106 may be powered by battery 314 or by an external power supply 316. Synchronized IR base stations 106 may provide for a simple and low cost installation and allow for a coexistence of IR base stations 106 without dead regions (typically caused by an overlap in coverage). RF transceiver 308 may be configured to receive RF transmissions, for example, beacons including the TSI from RF base station 110 (illustrated in FIG. 1) via antenna 312.

Although not shown in FIG. 3, a BS-ID associated with IR base station 106 may be stored by IR base station 106, for example, in a memory of microcontroller 306. Driver board 302 may be configured to transmit the associated BS-ID to IR transmitter 304. it is understood that IR transmitter may include any device suitable for transmitting an IR burst that includes the associated BS-ID.

The information content of the periodic bursts from IR base station 106 includes the ID of the respective IR base station 106. The power consumption of IR base station 106 is related to the size of the ID range, which typically spans 10-12 bits of information. If error detection and/or correction is added, more bits will be transmitted and the signal the power consumption increases commensurately.

Embodiments in accordance with the present disclosure are able to detect that a portable tag has moved from a first zone of influence to a second zone of influence within about 3 seconds of the move between zones having taken place. Although this 3-second detection time is significantly reduced from the 30-second detection time of the background art, the power consumption of the emitter used to transmit bits increases by only a factor of about two. Concomitantly, embodiments allow power consumption by the portable tag to be reduced because the power used to energize and operate the receive circuitry is relatively high in comparison to the rest of the portable tag circuitry, and embodiments may operate with the secondary technology receive circuitry energized and operated over a smaller amount of time. For example, the total amount of time the secondary technology receiver is energized and operated may be reduced from one interval of 3 seconds every 30 seconds (of the background art) to ten intervals of 250 mS (2.5 seconds total) every 30 seconds in accordance with an embodiment of the present disclosure.

Figure 4:
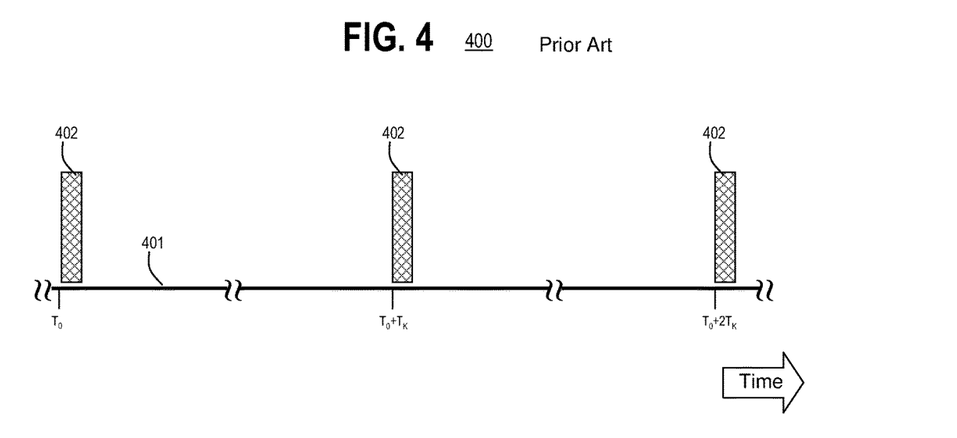
FIG. 4 depicts timing of TSI from an RF base station, in accordance with an embodiment of the present invention.

FIG. 4 illustrates a signal timing diagram 400 of an RTL System of the background art. Diagram 400 illustrates a portion of a timeline 401 between time $t=T_0$ to time $t=T_0+2T_K$. Timeline 401 continues indefinitely before $t=T_0$ and after time $t=T_0+2T_K$. Timeline 401 illustrates periodic transmission of signal bursts 402, which are transmitted with a period of $T_K$ seconds. Each signal burst 402 is a burst digital signal of a predetermined length, e.g., a signal having a burst size of 12-bits. The period of signal bursts 402 is typically $T_K=3$ seconds. Signal bursts 402 may be transmitted on a secondary communication channel by a transmitter such as IR base station 106. The power needed by IR base station 106 to transmit signal burst 402 is proportional to the number of bits in the burst, i.e., every bit of the burst consumes one unit of power consumption. The digital content of signal burst 402 may include identification information in order to allow a receiving tag to support position determination. Diagram 400 is not necessarily drawn to scale.

A large facility having multiple IR base stations 106 may have each IR base station 106 adhere to signal timing diagram 400, however the relative timing from one IR base station 106 to another IR base station 106 may be offset (e.g., each IR base station 106 has a different $T_0$) so that the signals from IR base stations 106 do not interfere with each other as received by a portable tag that may be in receiving range of multiple IR base stations 106.

Figure 5:
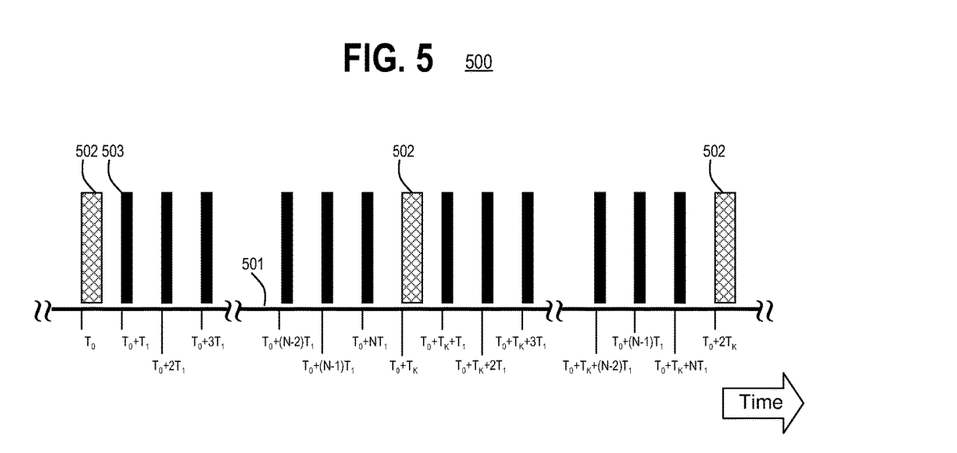
FIG. 5 depicts timing of operations at an IR base station, in accordance with another embodiment of the present invention.

FIG. 5 illustrates a signal timing diagram 500 in accordance with an embodiment of the present disclosure. Signal timing diagram 500 illustrates a portion of a timeline 501 between time $t=T_0$ to time $t=T_0+2T_K$. Timeline 501 continues indefinitely before $t=T_0$ and after time $t=T_0+2T_K$. Similarly to signal timing diagram 400, timeline 501 illustrates periodic transmission of signal burst 502, which are transmitted with a period of $T_K$ seconds. Each signal burst 502 is a burst digital signal of a predetermined length, e.g., a signal having a burst size of 12-bits. The period of signal burst 502 is typically $T_K=3$ seconds. Signal burst 502 may be transmitted by a transmitter such as IR base station 106. The power needed by IR base station 106 to transmit signal burst 502 is proportional to the number of bits in the burst, i.e., every bit of the burst consumes one unit of power consumption. The digital content of signal burst 502 may include identification information in order to allow a receiving tag to support position determination. Signal burst 502 may also include overhead bits, e.g., for start and stop bits, for error detection and/or correction, and so forth. Diagram 500 is not necessarily drawn to scale.

Signal timing diagram 500 improves upon signal timing diagram 400 by including transmission of a plurality of narrow markers 503 using a secondary technology channel. Narrow marker signals 503 may also be referred to as wake-up signals because if a portable tag detects a narrow marker signal 503, then the portable tag may energize its secondary technology receiver circuitry with improved timing accuracy in order to receive signal burst 502. For sake of clarity, only one such narrow marker 503 is marked with a reference number in FIG. 5. Each of narrow marker 503 represents a smaller number of bit periods compared to signal burst 502. In some embodiments, narrow marker 503 represents one bit period of a signal having the same bit rate as that of signal burst 502. As illustrated in FIG. 5, narrow marker 503 repeats with a period equal to $T_1$ seconds. In some embodiments, period $T_1$ of narrow marker 503 may be a submultiple of period $T_K$ of signal burst 502, e.g., if $T_K$ is 3 seconds, then $T_1$ may be 250 milliseconds and index "N" may have the value 11. Other combinations of values for $T_K$, $T_1$ and/or N are contemplated. In some embodiments, a particular narrow marker 503 may be omitted if it would collide or overlap in time with a signal burst 502. Typically, there is much less overhead to transmit a narrow marker 503 signal compared to transmission of signal burst 502, e.g., narrow marker 503 may omit transmission of overhead such as start/stop bits, error detection and/or correction, and so forth.

The energy cost to IR base station 106 of transmitting signal timing diagram 500 is higher than the energy cost of transmitting signal timing diagram 400, with the energy cost increase dependent upon $T_K$, $T_1$ and the duration of the marker signals. For example, if signal burst 502 is 12 bits long, narrow marker signal 503 is one bit long, $T_K=3$ seconds and $T_1=250$ ms, then the increase in energy consumption by IR base station 106 to transmit the signal, going from signal timing diagram 400 to signal timing diagram 500, is a factor of at least 11/12 (i.e., at least 91.7%), and which may be even greater if pulse-position modulation (PPM) is used.

Additional embodiments may encompass different combinations of burst size, burst repetition rate and marker repetition rate in accordance with the present disclosure. Embodiments are not limited in this regard unless specifically noted.

We now consider the energy consumption by the portable tag. A controllable component of the energy consumption is the amount of time that the secondary technology receiver circuitry in the portable tag must be energized in able to receive a secondary technology signal. In RTL systems of the known art (e.g., as represented by the timing diagram of FIG. 4), a portable tag may need to energize its receiver section once every $T_K$ seconds, for a duration at least long enough to receive a signal burst 502. If the timing kept by the portable tag is not synchronized to IR base station 106 (e.g., if its local clock has drifted or if the portable tag has moved to a spatial domain covered by a different IR base station 106), then the portable tag may need to energize its receiver section by up to $T_K$ seconds as it waits to receive a signal burst 502.

Figure 6:
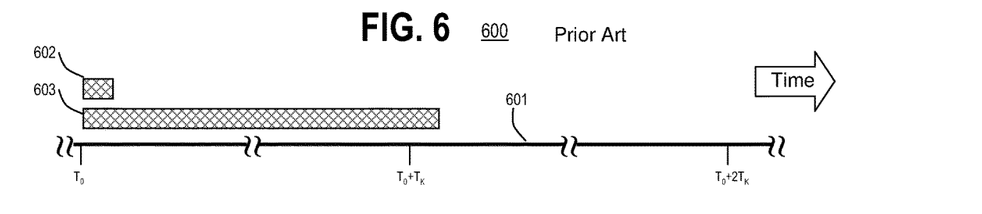
FIG. 6 depicts timing of TSI from an RF base station, in accordance with another embodiment of the present invention.

FIG. 6 illustrates a timing diagram 600 showing when the portable tag energizes its receiver section in accordance with the timing diagram of FIG. 4. Diagram 600 includes a timeline 601 that is of the same scale as timeline 401 of FIG. 4. If the timing kept by the portable tag is synchronized to IR base station 106, then the portable tag needs to energize its secondary technology receiver only during the period of time 602 in order to receive signal burst 402. However, if the timing kept by the portable tag is not synchronized to IR base station 106, then the portable tag needs to keep its secondary technology receiver energized during the period of time 603 in order to ensure receiving a signal burst 402. Therefore, the secondary technology receiver may be energized for as long as $T_K$ seconds plus the length of the signal burst 403 itself. Period of time 603 may end early before that time if a signal burst 402 is completely received.

Figure 7A:
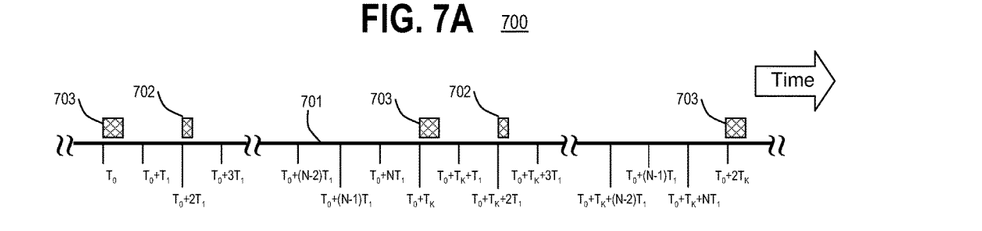
FIGS. 7A-7C depict timing of operations at an IR base station, in accordance with another embodiment of the present invention.

FIG. 7A illustrates a timing diagram 700 in which the portable tag energizes its receiver section in accordance with the timing diagram of FIG. 5. All like-numbered intervals illustrated in FIG. 7A are substantially the same. FIG. 7A is applicable to a scenario in which the timing synchronization by the portable tag is accurate. In contrast to FIG. 6, a portable tag in accordance with an embodiment of the present disclosure may be designed to energize its IR receiver circuitry for a first time window 702, during which a narrow marker signal 503 is expected to arrive. First time window 702 may be timed to coincide with any of the N narrow marker signals per time period $T_K$. If the timing synchronization by the portable tag is accurate, then the narrow marker signal 503 will be received, and the portable tag may be designed to energize its IR receiver circuitry for a second time window 703 during which a signal burst 502 is expected to arrive. Timing diagram 700 repeats every $T_K$ seconds.

Figure 7B:
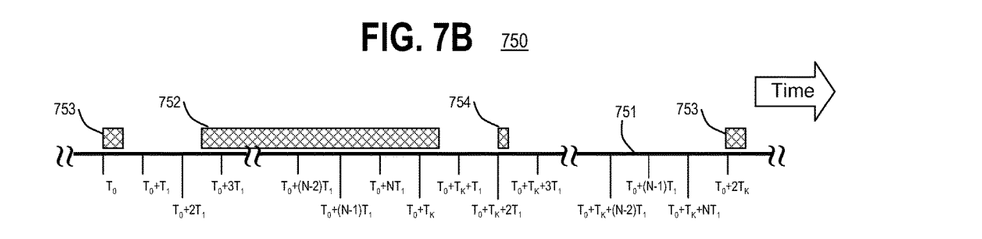

FIG. 7B illustrates a timing diagram 750 in which the portable tag energizes its receiver section in accordance with the timing diagram of FIG. 5. FIG. 7B is applicable to a scenario in which the timing synchronization by the portable tag is inaccurate after the time $T_0$. For inaccurate timing synchronization, (e.g., either by drift or movement of the portable tag), then the portable tag may need to energize its secondary technology receiver by up to only $T_1$ seconds in order to receive the narrow marker signal 503. In some embodiments, the portable tag may continue to energize its secondary technology receiver every $T_1$ seconds until a signal burst 502 is received, in order to establish accurate knowledge of $T_0$ for the wireless system that the portable tag is communicating with. FIG. 7B illustrates that a first time window 752 failed to receive the narrow marker signal 503 at $t=T_0+2T_1$ because the portable tag synchronization was inaccurate. Therefore, the portable tag continues to energize its receiver section, as indicated by the relatively long duration of first time window 752, until the next signal burst 502 at $t=T_0+T_K$. Thereafter, the portable tag can determine accurate timing synchronization, and enable its secondary technology receiver circuitry during subsequent time periods 754 to receive narrow marker signals 503, and time periods 753 to receive signal bursts 502.

Figure 7C:
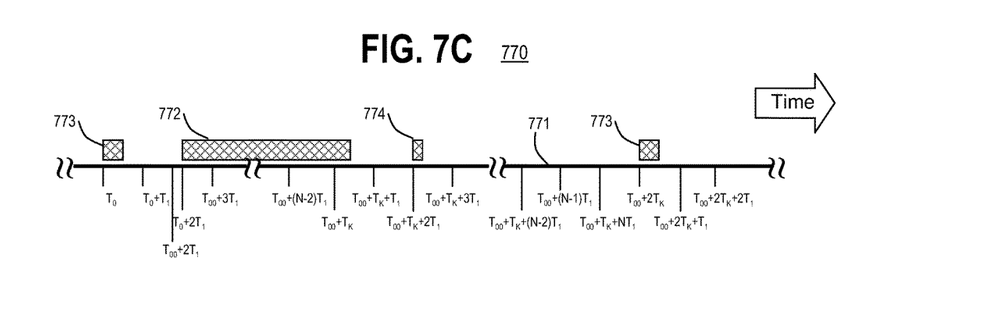

FIG. 7C illustrates a timing diagram 770 in which the portable tag energizes its receiver section in the presence of narrow marker signals 503. FIG. 7C is applicable to a scenario in which the timing synchronization by the portable tag is inaccurate after the time $T_0$ because of movement of the portable tag to a zone of influence of a different IR base station 106. At time $t=T_0$ the portable tag received a signal burst from a domain of a first IR base station 106 during time window 773. However, between $t=T_0$ and $t=T_0+2T_1$, the portable tag may have moved to a domain of a different IR base station 106, and consequently does not receive a narrow marker signal 503 transmitted at, e.g., $t=T_0+2T_1$ by the first IR base station 106. Therefore, the portable tag continues to energize its receiver section, as indicated by the relatively long duration of first time window 772, at least until the portable tag receives a next narrow marker signal 503 transmitted by the second IR base station 106, e.g., at $t=T_{00}+3T_1$. The portable tag may continue to keep its receiver circuitry energized until it receives signal burst 502 transmitted by the second IR base station 106, e.g., at $t=T_{00}+T_K$. Thereafter, the portable tag may determine accurate timing synchronization while in the domain of the second IR base station 106, and may enable its secondary technology receiver circuitry during subsequent time periods 774 to receive narrow marker signals 503, and time periods 773 to receive signal bursts 502, both from the second IR base station 106.

In another embodiment of the present disclosure, two markers having a pre-specified spacing between them per marker period (e.g., a marker period of 250 mS) may be used to reduce false detection of a marker that may be caused by noise in the transmission channel of the secondary technology. For example, in some embodiments of the present invention, in order to improve immunity to noise, an IR base station 106 may transmit a marker pair per marker period (i.e., per period $T_1$ as illustrated in FIGS. 5-7C), with a predetermined time spacing between the two halves of the pair, and a predetermined time separation from marker halves in an adjacent marker period. A portable tag may recognize the signal as being a marker pair based upon detection of a predetermined time separation between the signals, typically 3-10 msec. If the portable tag detects signals with the predetermined time separation, the portable tag may infer the presence of a secondary technology emission zone (rather than random noise), determine an expected time to receive a signal burst 502, and energize its secondary technology receiver at a time during which the portable tag would expect to receive a signal burst 502. Alternatively, if the portable tag cannot detect the marker pair, the portable tag may have to energize its secondary receiver substantially continuously in a noisy environment until a signal burst 502 is detected.

In some embodiments in accordance with the present disclosure, in order to further reduce detected noise power on the secondary technology signal and/or further improve the received signal-to-noise ratio, an IR base station 106 may transmit more than two marker portions per marker period $T_1$, the marker portions having a predetermined time spacing and a predetermined time separation from marker portions in an adjacent marker period.

In another embodiment in accordance with the present disclosure, tag marker transmission timing design may be modified in order to allow a tradeoff between power consumption and detection speed. For example, tag marker reception design may be changed to a 250 mS duration with a repetition rate of once every 6 seconds. A portable tag would concurrently energize its secondary technology receiver circuitry for just the 250 mS marker duration once every 6 seconds. This modified timing design reduces the IR receiver power consumption by a factor of two while increasing the detection time delay by a factor of two (i.e., to 6 seconds). This approach of allowing a tradeoff between power consumption and detection speed allows flexibility in balancing user requirements for different applications.

In some embodiments in accordance with the present disclosure, the tag marker period $T_1$ may be adjustably modified during operation to allow dynamic tradeoff between power consumption and detection speed. For example, a portable tag may have its secondary technology receiver circuitry enabled less often, such as every $2T_K$ seconds (e.g., every six seconds, for $T_1=250$ mS and N=9), under some predetermined conditions such as lack of movement or infrequent movement to a different zone of influence within a configurable amount of time. Less frequent enabling of the secondary technology receiver circuitry may reduce the IR receiver power consumption of the portable tag by a proportional amount (e.g., half the power consumption), while doubling the maximum time to detect a marker signal by a proportional amount (e.g., doubling to 6 seconds). An ability to perform adjustable modifications during operation allows flexibility in balancing user requirements for different applications of the portable tag.

In some embodiments in accordance with the present disclosure, a portable tag may lock onto a secondary technology signal burst 502 after the portable tag enters a zone of influence and may stop listening to the narrow marker signals 503 in order to save power by avoiding energizing the secondary technology receiver. By locking onto the secondary technology signal burst 502, the portable tag may estimate with a greater degree of accuracy when the next secondary technology emission will be received, and can correct its internal timing based upon the time of receipt of the secondary technology emission. The tag may enable its secondary technology receiver circuitry based on the locked IR signal. Doing so may reduce power consumption of the portable tag, with no impact to the power consumption of IR base station 106. The portable tag may return to listening to markers only after the portable tag loses lock or leaves the zone of influence. However, a shortcoming of locking onto the secondary technology signal is that such locking slows the detection of when the portable tag moves to a different zone of influence, because the tag needs to detect a loss of lock when leaving a zone of influence before the portable tag listens again received markers.

In some embodiments in accordance with the present disclosure, a portable tag under the influence of a zone of influence continues to listen to markers while locked to the IR signal. Listening to markers this way lets the portable tag recognize relatively quickly a movement to another zone of influence because the timing of the narrow signal markers will be different for different zones of influence. If the zone of influence has changed, the new zone of influence may then be received without a need to energize the receiver circuitry of the portable tag for an excessively long time. This embodiment may enable faster transition detection between different zones of influence, but at the cost of slightly increases power consumption by the portable tag.

In some embodiments in accordance with the present disclosure, each narrow marker 503 of the plurality of narrow markers 503 includes only a single energy pulse of the secondary technology.

In some embodiments, a plurality of narrow markers 503 are transmitted by an emitter and received by a portable tag, during a time interval between consecutive signal bursts 502. This will result in a repetition rate of the narrow markers 503 being higher than a repetition rate of signal burst 502.

In some embodiments, the portable tag may be configured to energize its secondary technology receiver for a time window of slightly greater duration than the length of time between consecutive narrow markers 503, and at a repetition rate that is approximately equal to the repetition rate of signal burst 502.

In some embodiments, the portable tag may be configured to energize its secondary technology receiver for a time window beginning upon reception of a narrow marker 503 and ending on or after reception of a signal burst 502.

In some embodiments, the portable tag may be configured to energize its secondary technology (e.g., IR) receiver at a rate which is N times lower than the repetition rate of the signal bursts 502. For example, if the repetition rate of signal bursts 502 is every 3 seconds, and N=3, the secondary technology receiver of the portable tag would be energized every 9 seconds for a period of about the period between consecutive narrow markers 503, e.g., about 250 mS.

In some embodiments, the portable tag may be configured to lock itself to the signal rate of the signal bursts 502, and to energize the secondary technology receiver only when reception of one narrow marker 503 from the plurality of narrow marker 503 is expected, and/or when one signal burst 502 from the plurality of signal bursts 502 is expected. The dependence and/or adjustment of the timing of the portable tag based upon the timing of reception of narrow markers 503 and/or signal bursts 502 may be denoted as being in a locked state.

In some embodiments, the portable tag may be configured to energize its secondary receiver to receive to narrow markers 503 while locked to the signal bursts 502, in order to identify relatively quickly a transition to another zone of influence.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

What is claimed is:

1. A Real Time Location (RTL) system comprising:
   a base-station comprising: a processor coupled to a memory; and an interface to couple the processor with a secondary technology communication channel,
   wherein the processor is programmed to cause the base-station to emit: a first periodic signal on the secondary technology communication channel and having a first repetition rate, to communicate an identification of the base-station; and a second periodic signal on the secondary technology communication channel and having a second repetition rate, to provide a wake-up signal, wherein transmitted energy of the second periodic signal in one period of the second periodic signal is less than transmitted energy of the first periodic signal in one period of the first periodic signal, and
   wherein the second periodic signal is continuously periodic when not overlapping the first periodic signal.

2. The RTL system of claim 1, further comprising a portable tag configured to receive the first and second periodic signals and control a timing of a receiver of the portable tag based upon the first and second periodic signals.

3. The RTL system of claim 1, wherein the secondary technology comprises infrared technology.

4. The RTL system of claim 1, wherein the secondary technology comprises ultrasound technology.

5. The RTL system of claim 1, wherein the second periodic signal is divisible into a plurality of second signal periods comprising a respective single pulse of the second periodic signal.

6. The RTL system of claim 1, wherein a plurality of second periodic signals are transmitted using a predetermined timing pattern during one period of the first periodic signal.

7. The RTL system of claim 1, wherein the second periodic signal comprises a plurality of sub-pulses.

8. The RTL system of claim 2, wherein the portable tag is configured to periodically energize a secondary technology receiver of the portable tag at a rate approximately equal to the first repetition rate, for a time window longer than one period of the second repetition rate.

9. The RTL system of claim 2, wherein the portable tag is configured to continuously energize a secondary technology receiver of the portable tag during a period of time from receipt of one pulse of the second periodic signal to one transmission of the first periodic signal.

10. The RTL system of claim 2, wherein the portable tag is configured to continuously energize a secondary technology receiver of the portable tag at a rate that is slower than the repetition rate of the second periodic signal.

11. The RTL system of claim 2, wherein the portable tag is configured to lock to the second periodic signal and to energize a secondary technology receiver of the portable tag only when one pulse of the second periodic signal is expected.

12. The RTL system of claim 2, wherein the portable tag is configured to energize a secondary technology receiver of the portable tag when pulses of the second periodic signal are expected to be received in order to identify a change in the first or second periodic signal.

13. A Real Time Location (RTL) method comprising:
    emitting a first periodic signal burst having a first repetition rate using a secondary technology communication channel, to communicate an identification of a base-station;
    emitting a second periodic signal burst having a second repetition rate using the secondary technology communication channel, to provide a wake-up signal, wherein transmitted energy of the second periodic signal in one period of the second periodic signal is less than transmitted energy of the first periodic signal in one period of the first periodic signal, wherein the second periodic signal burst is continuously periodic when not overlapping the first periodic signal burst; and
    receiving the first and second periodic signals by a portable tag; and
    controlling receiver timing of the portable tag based upon the first and second periodic signals.

14. The RTL method of claim 13, wherein the secondary technology comprises infrared technology.

15. The RTL method of claim 13, wherein the secondary technology comprises ultrasound technology.

16. The RTL method of claim 13, further comprising transmitting a plurality of second periodic signals by use of a predetermined timing pattern during one period of the first periodic signal.

17. The RTL method of claim 13, wherein the second periodic signal comprises a plurality of sub-pulses.

18. The RTL method of claim 13, further comprising periodically energizing a secondary technology receiver of the portable tag at a rate approximately equal to the first repetition rate, for a time window longer than one period of the second repetition rate.

19. The RTL method of claim 13, further comprising continuously energizing a secondary technology receiver of the portable tag during a period of time from receipt of one pulse of the second periodic signal to one transmission of the first periodic signal.

20. The RTL method of claim 13, further comprising continuously energizing a secondary technology receiver of the portable tag at a rate that is slower than the repetition rate of the second periodic signal.

21. The RTL method of claim 13, further comprising locking the portable tag to the second periodic signal and energizing a secondary technology receiver only when one pulse of the second periodic signal is expected.

* * * * *